(12) United States Patent
Kuroyanagi et al.

(10) Patent No.: US 10,655,530 B2
(45) Date of Patent: May 19, 2020

(54) INTERCOOLER

(71) Applicant: DENSO CORPORATION, Kariya, Aichi-pref. (JP)

(72) Inventors: Isao Kuroyanagi, Kariya (JP); Masaki Harada, Kariya (JP); Takefumi Kawaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/076,714

(22) PCT Filed: Dec. 19, 2016

(86) PCT No.: PCT/JP2016/087726
§ 371 (c)(1),
(2) Date: Aug. 9, 2018

(87) PCT Pub. No.: WO2017/138260
PCT Pub. Date: Aug. 17, 2017

(65) Prior Publication Data
US 2019/0048786 A1 Feb. 14, 2019

(30) Foreign Application Priority Data

Feb. 12, 2016 (JP) ................... 2016-024334

(51) Int. Cl.
*F02B 29/04* (2006.01)
*F28D 9/00* (2006.01)

(52) U.S. Cl.
CPC .......... *F02B 29/0462* (2013.01); *F02B 29/04* (2013.01); *F28D 9/0056* (2013.01); *F01P 2060/02* (2013.01); *Y02T 10/146* (2013.01)

(58) Field of Classification Search
CPC ... F01P 2060/02; F02B 29/04; F02B 29/0462; F28D 9/0056; Y02T 10/146
See application file for complete search history.

(56) References Cited

U.S. PATENT DOCUMENTS 4,311,193 A * 1/1982 Verhaeghe ............ F28D 1/0535
165/149
6,357,518 B1 * 3/2002 Sugimoto ............. F28D 1/0435
165/135
(Continued)

FOREIGN PATENT DOCUMENTS

DE 102006008826 A1 8/2007
JP H06147785 A 5/1994
(Continued)

OTHER PUBLICATIONS

U.S. Appl. No. 16/076,713, filed Aug. 9, 2018, Kuroyanagi et al.

*Primary Examiner* — Jesse S Bogue
(74) *Attorney, Agent, or Firm* — Harness, Dickey & Pierce, P.L.C.

(57) ABSTRACT

An intercooler includes a heating portion in which flow path tubes and fins are stacked with each other. A second cooling medium flow path of the flow path tubes is located upstream of a first cooling medium flow path of the flow path tubes with respect to a flow direction of supercharged intake air. The second cooling medium flow path includes a second U-turn portion in which the second cooling medium makes a U-turn. In the second cooling medium flow path, a downstream flow path located downstream of the second U-turn portion is located upstream, in the flow direction of the supercharged intake air, of an upstream flow path located upstream of the second U-turn portion. The fins include a heat exchange limiting portion at least in a part adjacent to a most upstream part, in the flow direction of the supercharged intake air, of the downstream flow path.

6 Claims, 8 Drawing Sheets

(56) References Cited

U.S. PATENT DOCUMENTS

| | | | |
|---|---|---|---|
| 6,688,292 B2 * | 2/2004 | Ruppel | F02B 29/0412 |
| | | | 123/563 |
| 7,104,062 B2 | 9/2006 | Amaral | |
| 7,147,047 B2 * | 12/2006 | Wolk | F28D 1/05383 |
| | | | 165/152 |
| 7,267,163 B2 * | 9/2007 | Osakabe | F28D 9/0043 |
| | | | 165/153 |
| 8,191,365 B2 | 6/2012 | Quinn et al. | |
| 9,766,023 B2 * | 9/2017 | Schatz-Knecht | F28F 9/001 |
| 9,939,208 B2 * | 4/2018 | Sugimura | F28D 1/05383 |
| 2007/0000457 A1 | 1/2007 | Guerrero et al. | |
| 2007/0251681 A1 * | 11/2007 | Higashiyama | F25B 39/022 |
| | | | 165/153 |
| 2009/0133860 A1 | 5/2009 | Harada et al. | |
| 2010/0155014 A1 | 6/2010 | Guerrero et al. | |
| 2013/0276763 A1 | 10/2013 | Eilemann et al. | |
| 2015/0300757 A1 * | 10/2015 | Yang | F28D 1/05366 |
| | | | 165/149 |
| 2016/0326949 A1 * | 11/2016 | Harada | F28D 9/0043 |
| 2016/0356205 A1 * | 12/2016 | Braun | F02B 29/0443 |
| 2017/0082381 A1 * | 3/2017 | Sugimura | F28D 1/05383 |

FOREIGN PATENT DOCUMENTS

| | | | |
|---|---|---|---|
| JP | 2009127937 A | | 6/2009 |
| JP | 2015004332 A | | 1/2015 |
| JP | 2015145667 A | | 8/2015 |
| JP | 2015155692 A | | 8/2015 |
| JP | 2016023556 A | | 2/2016 |
| WO | WO-2004044401 A1 | | 5/2004 |
| WO | WO-2004085810 A2 | | 10/2004 |
| WO | WO-2012080508 A1 | | 6/2012 |
| WO | WO-2015146123 A1 * | | 10/2015 |

* cited by examiner

INTERCOOLER

CROSS REFERENCE TO RELATED APPLICATIONS

This application is a U.S. National Phase Application under 35 U.S.C. 371 of International Application No. PCT/JP2016/087726 filed on Dec. 19, 2016 and published in Japanese as WO/2017/138260 A1 on Aug. 17, 2017. This application is based on and claims the benefit of priority from Japanese Patent Application No. 2016-024334 filed on Feb. 12, 2016. The entire disclosures of all of the above applications are incorporated herein by reference.

TECHNICAL FIELD

The present disclosure relates to an intercooler for cooling intake air supercharged by a supercharger.

BACKGROUND ART

An intercooler that cools supercharged intake air is known, which performs heat exchange between the supercharged air supplied to an engine by a supercharger and two types of cooling water having temperatures different from each other (see, for example, Patent Literature 1). In the intercooler disclosed in Patent Document 1, the hot cooling water makes a U-turn on the upstream side in the flow direction of the supercharged intake air, and the cold cooling water makes a U-turn on the downstream side in the flow direction of the supercharged intake air. In the hot cooling water flow path and the cold cooling water flow path, inner fins for promoting heat exchange between the cooling water and the supercharged intake air are provided.

According to the configuration as above, the cold cooling water can be warmed quickly with heat of the hot cooling water at engine start-up. Further, because the supercharged intake air can be pre-cooled with the hot cooling water before the supercharged intake air is cooled with the cold cooling water, cooling performance of a supercharged intake air cooling system can be improved.

PRIOR ART DOCUMENT

Patent Document

Patent Document 1: JP 2015-155692 A

SUMMARY OF THE INVENTION

In the intercooler described in Patent Document 1, the hot cooling water flow path has a U-turn structure in which a downstream flow path is located upstream of an upstream flow path with respect to the flow of the supercharged intake air. Therefore, in the downstream flow path of the hot cooling water flow path, the cooling water exchanges heat with hot supercharged intake air, and accordingly the temperature of the cooling water is likely to increase. Since the hot cooling water flow path has the U-turn structure, a narrow flow path, and inner fins, a pressure loss of the cooling water may be large, and the boiling point of the cooling water may decrease.

As a result, the cooling water may boil in the downstream flow path in the hot cooling water path. If the cooling water boils in the hot cooling water flow path, it may cause a temperature increase of components around the hot cooling water flow path, and accordingly a strength of the components may decrease and the components may be damaged.

In view of the above, it is an object of the present disclosure to suppress a boiling of cooling medium in an intercooler which is configured to cool a supercharged intake air with two kinds of cooling medium having different temperature.

According to one aspect of the present disclosure, an intercooler cools supercharged intake air by exchanging heat between supercharged cooling medium and the supercharged intake air supercharged to an engine by a supercharger. The intercooler includes a heating portion in which flow path tubes and fins are stacked with each other, and the heating portion is configured to exchange heat between the cooling medium flowing inside the flow path tubes and the supercharged intake air flowing outside the flow path tubes. The cooling medium includes first cooling medium and second cooling medium whose temperature is higher than a temperature of the first cooling medium. The flow path tubes define therein: a first cooling medium flow path through which the first cooling medium flows in a direction intersecting a flow direction of the supercharged intake air; and a second cooling medium flow path through which the second cooling medium flows in a direction intersecting the flow direction of the supercharged intake air. The second cooling medium flow path is located upstream of the first cooling medium flow path with respect to the flow direction of the supercharged intake air. The first cooling medium flow path includes a first U-turn portion in which the first cooling medium makes a U-turn, and the second cooling medium flow path includes a second U-turn portion in which the second cooling medium makes a U-turn. In the second cooling medium flow path, a downstream flow path located downstream of the second U-turn portion is located upstream, in the flow direction of the supercharged intake air, of an upstream flow path located upstream of the second U-turn portion. The fins include a heat exchange limiting portion at least in a most upstream part of the fins in the flow direction of the supercharged intake air, the heat exchange limiting portion being configured to limit a heat exchange between the supercharged intake air and the second cooling medium.

According to this, in the most upstream part in the flow direction of the supercharged intake air, the heat of the supercharged intake air is prevented from transmitted to the second cooling water in the outlet side passage through the fins. As a result, it is possible to suppress boiling of the second cooling water in the outlet side passage where the second cooling water may easily boil. Accordingly, temperature increase of components around the second outlet side flow path can be suppressed, and reduction in strength and breakage can be avoided.

EMBODIMENTS FOR EXPLOITATION OF THE INVENTION

Hereinafter, embodiments for implementing the present disclosure will be described referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The present disclosure is not limited to combinations of embodiments which combine parts that are explicitly described as being combinable. As long as no problems are present, the various embodiments may be partially combined with each other even if not explicitly described.

First Embodiment

A first embodiment of the present disclosure will be described with reference to the drawings. In the first embodiment, an example in which an intercooler of the present disclosure is applied to a supercharged intake air cooling system for a vehicle will be described.

Figure 1:
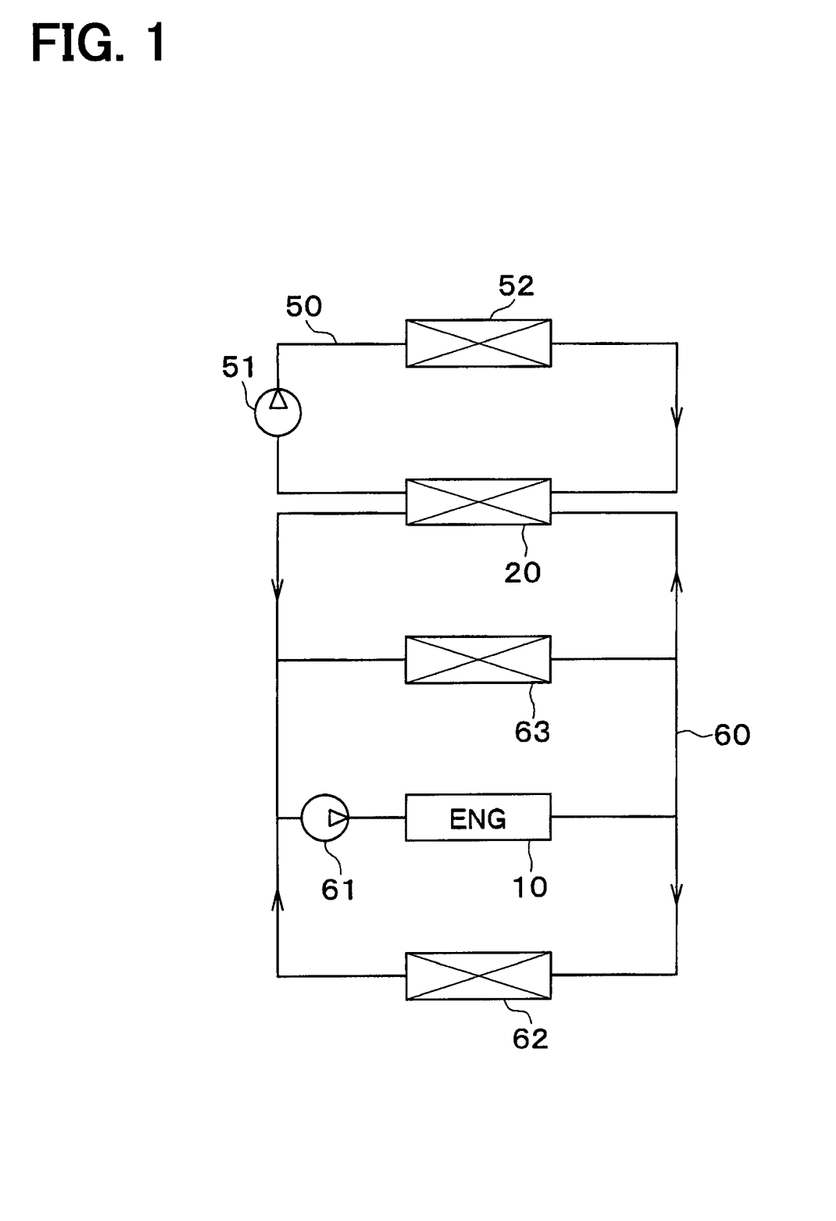
FIG. 1 is a diagram illustrating an overview of a supercharged intake air cooling system for a vehicle according to a first embodiment of the present disclosure.

A supercharger (not shown) for supercharging intake air to an engine 10 is provided in an intake air system of the engine 10 of the vehicle (that is, an internal combustion engine). This supercharger is provided to compensate for the maximum output of the engine 10. That is, the vehicle of the present embodiment has the engine 10 made smaller for higher fuel efficiency and the supercharger is used to compensate for the maximum output reduced in exchange for making the engine 10 smaller.

An intercooler 20 cooling engine intake air is located downstream of the supercharger in the intake air system with respect to a flow of the intake air. The intercooler 20 cools the supercharged intake air that has been compressed by the supercharger so as to improve a charging efficiency of the engine intake air.

First cooling water circulating in a first cooling water circuit 50 and second cooling water circulating in a second cooling water circuit 60 flows through the intercooler 20. The intercooler 20 cools the supercharged intake air by exchanging heat between first, second cooling water and the supercharged intake air compressed by the supercharger.

A water pump 51 that causes the first cooling water to circulate is provided in the first cooling water circuit 50. A first radiator 52 that cools the first cooling water by radiating heat of the first cooling water is provided between the water pump 51 and the intercooler 20 in the first cooling water circuit 50.

A water pump 61, a second radiator 62, and a heater core 63 are provided in the second cooling water circuit 60. The water pump 61 circulates the second cooling water in the second cooling water circuit 60. The second radiator 62 releases heat, to an outside air, of the second cooling water absorbed from the engine 10. The heater core 63 heats blown air by exchanging the second cooling water and the blown air blown toward a vehicle compartment. The intercooler 20, the second radiator 62 and the heater core 63 are arranged in the second cooling water circuit 60 in parallel with each other.

The second cooling water absorbs heat from the engine 10. Therefore, when the first, second cooling water pass through an inside of the intercooler 20, the second cooling water is higher in temperature than the first cooling water. That is, the first cooling water is cold cooling water, and the second cooling water is hot cooling water. The first cooling water of the present embodiment corresponds to first cooling medium of the present disclosure, and the second cooling water of the present embodiment corresponds to second cooling medium of the present disclosure. LLC (antifreeze mixture), water or the like may be used as the first, second cooling water.

A driving force of the water pumps 51, 61 are transmitted from the engine 10 in the present embodiment, but an electric water pump may be used as the water pumps 51, 61.

Figure 2:
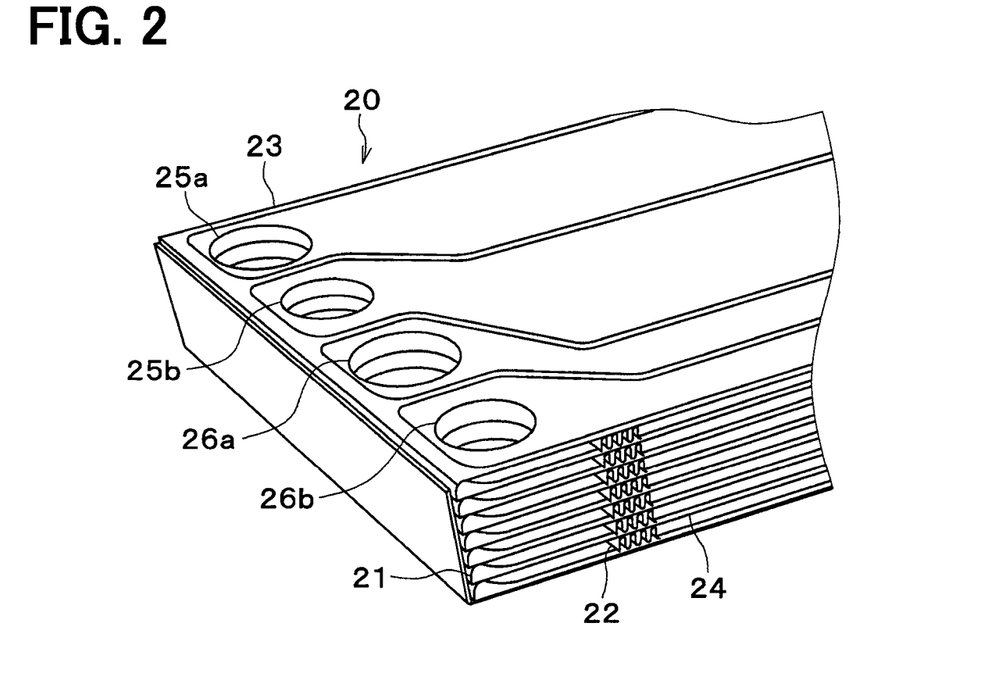
FIG. 2 is a perspective view illustrating an intercooler according to the first embodiment.

Subsequently, the intercooler 20 of the first embodiment will be described in detail. The intercooler 20 of the present embodiment is configured as a so-called drawn cup type heat exchanger. As shown in FIG. 2, the intercooler 20 includes a heat exchanging portion 23 in which multiple flow path tubes 21 and fins 22 bonded to adjacent flow path tubes 21 are alternately stacked with each other. Outer peripheries of a pair of plate members 24 are joined to each other to form the flow path tubes. The heat exchanging portion 23 exchanges heat between the first, second cooling water flowing inside the flow path tubes and the supercharged intake air flowing outside the flow path tubes 21. The space in which the fins 22 are arranged between the flow path tubes 21 stacked with each other constitutes a supercharged intake air flow path through which supercharged intake air flows.

All or some of the constituent parts of the intercooler 20 are formed of a clad material formed by cladding a brazing material on the surface of a core material made of, for example, aluminum. The respective components of the intercooler 20 are brazed and bonded with each other by heating it in a condition where the flux is applied to the surface of the clad material.

Figure 3:
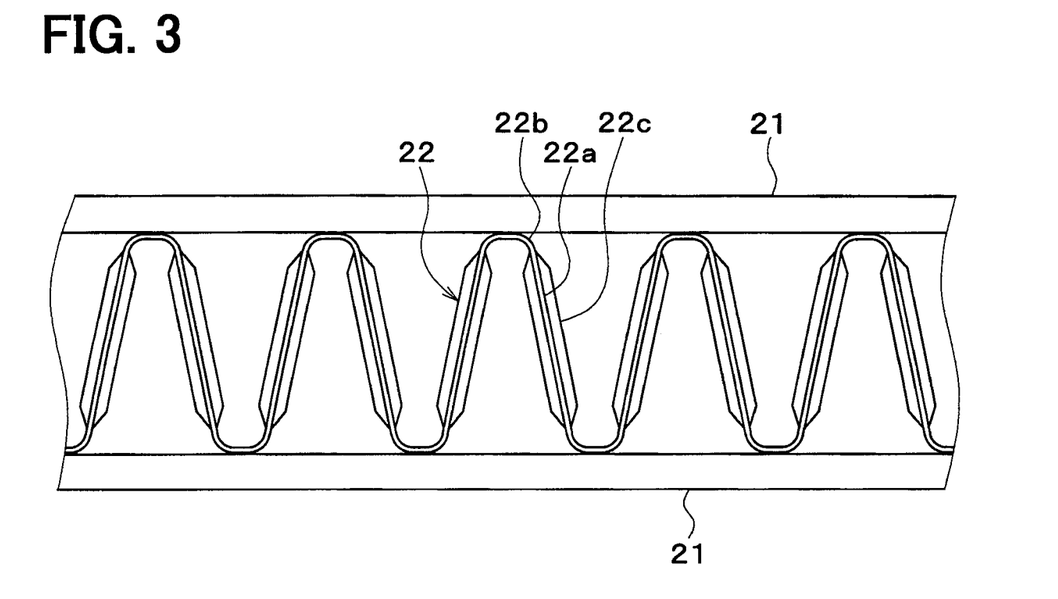
FIG. 3 is a front view illustrating flow path tubes and fins according to the first embodiment.

As shown in FIG. 3, the fin 22 of the present embodiment is a corrugated fin formed by bending a plate member into a corrugated shape. The fin 22 has a corrugated shape in which wall portions 22a constituting flat portions and peak portions 22b constituting bent portions are continuous. The fin 22 has a corrugated shape in which the peak portions 22b are alternately located on one side and the other side in a direction intersecting the direction of the flow of the supercharged intake air. The supercharged intake air flow path which is a space between the flow path tubes 21 stacked with each other is partitioned into multiple flow paths by the wall portion 22a. The fin 22 constitutes a heat exchange enhancing portion to increase a heat transmission area of the supercharged intake air and the first, second cooling water.

The fins 22 are configured as louver fins having louvers 22c formed on the wall portions 22a. The peak portions 22b of the fin 22 are brazed and bonded to the flat outer surface of the adjacent flow path tubes 21. The fin 22 can be formed, for example, by applying a roller molding method to a thin sheet metal material. The fin 22 will be described later in detail.

Figure 4:
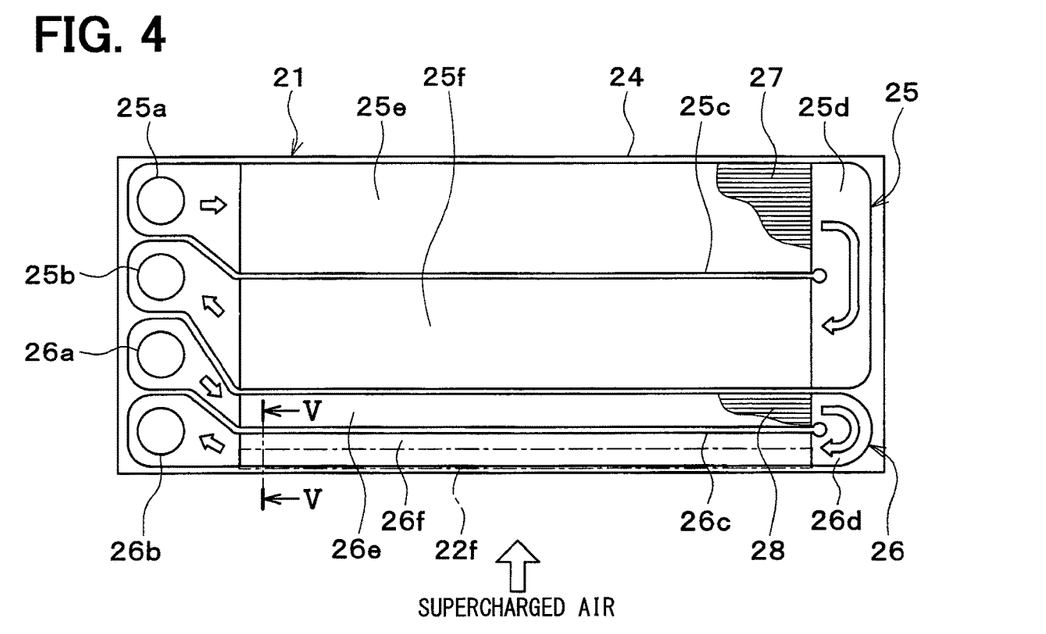
FIG. 4 is a schematic view illustrating an inside of the flow path tube according to the first embodiment.

As shown in FIG. 4, the flow path tubes 21 define therein a first cooling water flow path 25 through which the first cooling water flows and a second cooling water flow path 26 through which the second cooling water flows. In the flow path tube 21, the first cooling water flow path 25 and the second cooling water flow path 26 are arranged in parallel with each other in the flow direction of supercharged intake air. The flow direction of the cooling water in the cooling water flow paths 25, 26 is a direction intersecting the flow direction of supercharged intake air, more specifically, a direction orthogonal to the flow direction of supercharged intake air.

In the present embodiment, the first cooling water flow path 25 is located on a downstream side in the flow direction of the supercharged intake air, and the second cooling water flow path 26 is located on an upstream side in the flow direction of the supercharged intake air. That is, in the intercooler 20 of the present embodiment, the hot second cooling water flows on the upstream side of the supercharged intake air flow path through which the supercharged intake air flows, and the cold first cooling water flows on the downstream side of the supercharged intake air flow path.

The flow path lengths of the first cooling water flow path 25 and the second cooling water flow path 26 are the same. The lengths of these cooling water flow paths 25, 26 in the flow direction of the supercharged intake air, i.e. the lengths in the width direction of the cooling water flow paths 25, 26, are set so that the first cooling water flow path 25 is longer than the second cooling water flow path 26.

Although not shown, the intercooler 20 includes a first distribution tank portion that distributes the first cooling water to the first cooling water flow paths 25 of the flow path tubes 21, and a first collecting tank portion for collecting the first cooling water from the first cooling water flow paths 25. Although not shown, the intercooler 20 includes a second distribution tank portion that distributes the second cooling water to the second cooling water flow paths 26 of the flow path tubes 21, and a second collecting tank portion for collecting the second cooling water from the second cooling water flow paths 26.

The flow path tube 21 includes a first inlet portion 25a through which the first cooling water flows into the first cooling water flow path 25, and a first outlet portion 25b through which the first cooling water flows out of the first cooling water flow path 25. The flow path tube 21 includes a second inlet portion 26a through which the second cooling water flows into the second cooling water flow path 26, and a second outlet portion 26b through which the second cooling water flows out of the second cooling water flow path 26. The first inlet portion 25a, the first outlet portion 25b, the second inlet portion 26a, and the second outlet portion 26b are provided as through-holes in the flow path tube 21.

The first cooling water flow path 25 includes a first partition portion 25c that partitions the flow path into two flow paths, and a first U-turn portion 25d in which the first cooling water makes a U-turn. The first cooling water flow path 25 is partitioned by the first partition portion 25c into a first upstream flow path 25e close to the first inlet portion 25a and a first downstream flow path 25f close to the first outlet portion 25b. The first upstream flow path 25e is located upstream of the first U-turn portion 25d, and the first downstream flow path 25f is located downstream of the first U-turn portion 25d.

The second cooling water flow path 26 includes a second partition portion 26c that partitions the flow path into two flow paths, and a second U-turn portion 26d in which the second cooling water makes a U-turn. The second cooling water flow path 26 is partitioned by the second partition portion 26c into a second upstream flow path 26e close to the second inlet portion 26a and a second downstream flow path 26f close to the second outlet portion 26b. The second upstream flow path 26e is located upstream of the second U-turn portion 26d, and the second downstream flow path 26f is located downstream of the second U-turn portion 26d.

As described above, the second cooling water flow path 26 is located upstream of the first cooling water flow path 25 with respect to the flow direction of the supercharged intake air. Accordingly, the second downstream flow path 26f, the second upstream flow path 26e, the first downstream flow path 25f, and the first upstream flow path 25e are arranged in this order from the upstream side of the flow direction of the supercharged intake air. That is, in the flow paths 25e, 25f, 26e, 26f provided in the flow path tubes 21, the second downstream flow path 26f of the second cooling water flow path 26 is located on the most upstream part with respect to the flow direction of the supercharged intake air.

The temperature of supercharged intake air decreases from the upstream side to the downstream side in the flow direction of the supercharged intake air. Therefore, the temperature of the supercharged intake air is highest when passing through the most upstream portion in the flow direction of the supercharged intake air in the second downstream side flow path 26f.

In the present embodiment, the first inlet portion 25a, the first outlet portion 25b, the second inlet portion 26a, and the second outlet portion 26b are provided at one end portion in the longitudinal direction of the flow path tubes 21 (that is, on the left side end portion in FIG. 4). The second outlet portion 26b, the second inlet portion 26a, the first outlet portion 25b, and the first inlet portion 25a are arranged in this order from the upstream side in the flow direction of the supercharged intake air. The first U-turn portion 25d and the second U-turn portion 26d are located on the other end portion in the longitudinal direction of the flow path tubes 21 (that is, the right side end portion in FIG. 4).

In the first cooling water flow path 25, a first inner fin 27 that divides the first cooling water flow path 25 into multiple narrow flow paths is provided. The first inner fin 27 is disposed in each of the first upstream flow path 25e and the first downstream flow path 25f of the first cooling water flow path 25. In the second cooling water flow path 26, a second inner fin 28 that divides the second cooling water flow path 26 into multiple narrow flow paths is provided. The second inner fin 27 is disposed in each of the second upstream flow path 26e and the second downstream flow path 26f of the second cooling water flow path 26.

Since the second cooling water flow path 26 has the U-turn structure, a narrow flow path, and the second inner fin 28, a pressure loss of the second cooling water may be large, and the boiling point of the second cooling water may decrease. In addition, since the temperature of the supercharged intake air is high on the upstream side in the flow direction, and since the supercharged intake air directly contacts the most upstream portion of the flow path tube 21 in the flow direction of the supercharged intake air, the temperature of the second cooling water flowing through the second downstream flow path 26f is especially likely to increase.

Figure 5:
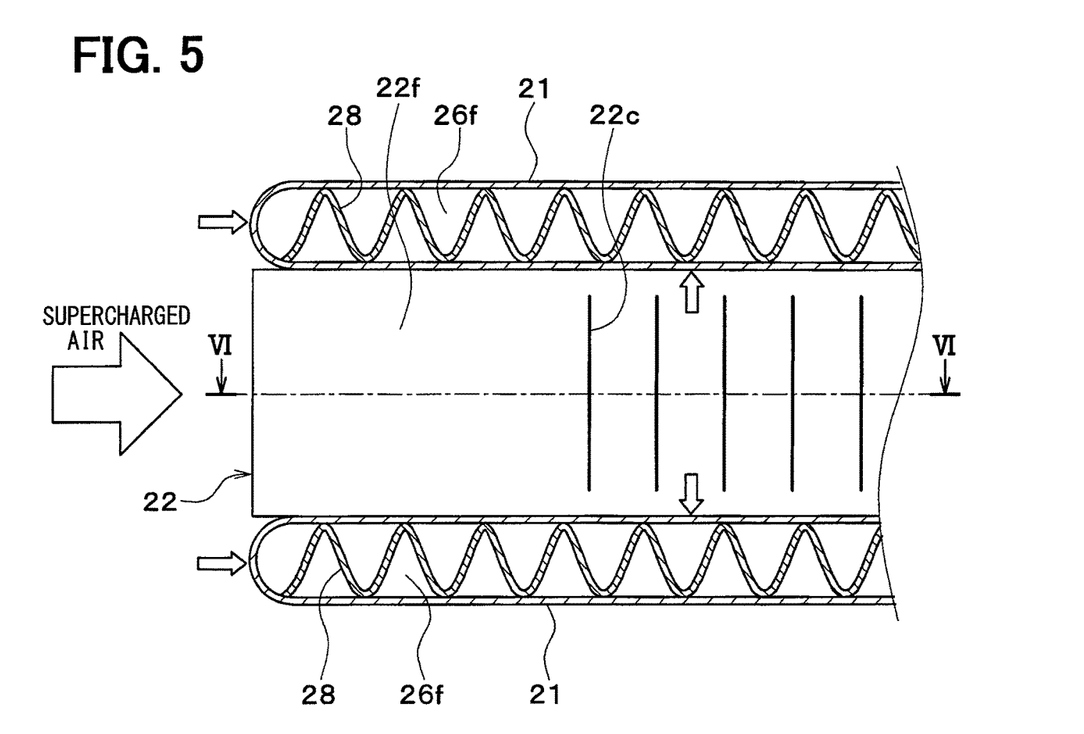
FIG. 5 is a cross-sectional view illustrating flow path tubes and fins according to the first embodiment.
Figure 6:
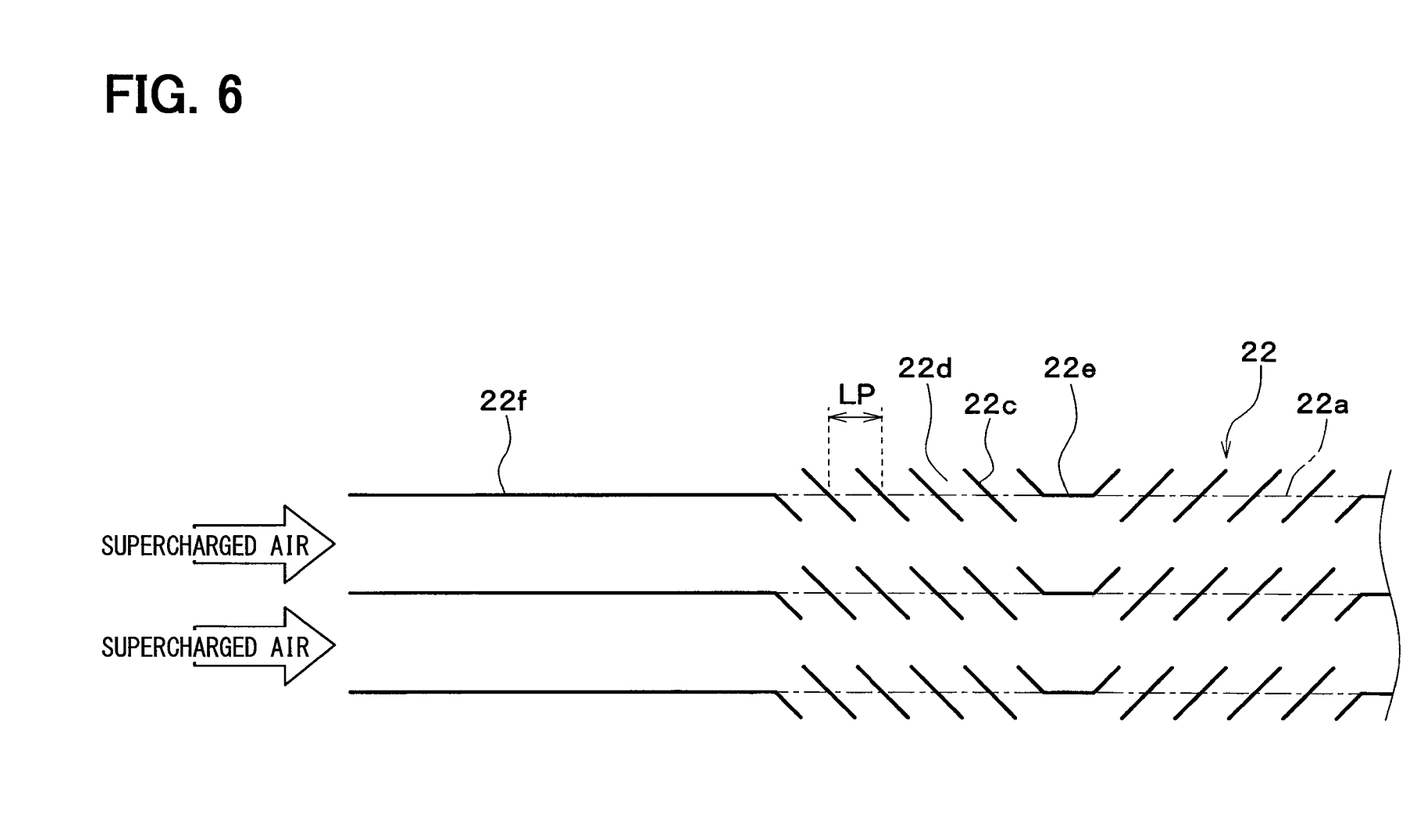
FIG. 6 is a cross-sectional view illustrating fins according to the first embodiment.

Next, the configuration of the fin 22 of this embodiment will be described with reference to FIGS. 5 and 6. FIG. 5 is a cross-sectional view taken along V-V line of FIG. 4. FIG. 6 is a cross-sectional view taken along VI-VI line of FIG. 5 and illustrating three wall portions 22a of the fin 22.

As shown in FIGS. 5 and 6, a louver 22c shaped like a window blind is formed integrally in the wall portion 22a of the fin 22 by cutting and raising the wall portion 22a. The heat transfer coefficient of the fin 22 is improved by the louver 22c, and the heat transfer performance can be improved.

As shown in FIG. 6, the louver 22c is cut and raised from the wall portion 22a at a predetermined angle, and multiple louvers 22c are provided in the wall portion 22a along the flow direction of the supercharged intake air. An inter-louver passage 22d through which air can flow is formed between adjacent louvers 22c formed on the same wall portion 22a. Multiple louvers 22c are formed in the same pattern on multiple wall portions 22a arranged in parallel with each other.

As shown in FIG. 6, one wall portion 22a has multiple louver groups in which multiple adjacent louvers 22c are provided in parallel with each other. In FIG. 6, two louver groups on one wall portion 22a are illustrated. Multiple louvers 22c included in the same louver group have the same inclination direction with respect to the wall portion 22a.

A turning portion 22e is provided between adjacent louver groups. The inclination direction, with respect to the wall portion 22a, of the louvers 22c of a louver group located upstream of the turning portion 22e with respect to the flow direction of the supercharged intake air is an opposite direction from the inclination direction of the louvers 22c of a louver group located downstream of the turning portion 22e.

As shown in FIGS. 5 and 6, a planar upstream flat portion 22f is provided at the most upstream part of the wall portion 22a in the flow direction of supercharged intake air. The upstream flat portion 22f constitutes a non-louvered portion in which the louver 22c is not formed. A part of the fin 22 excluding the upstream flat portion 22f (that is, the louver 22c and the turning portion 22e) constitutes a louvered portion. The length of the upstream flat portion 22f in the flow direction of the supercharged intake air is longer than the length of the louver pitch LP which is the distance between the adjacent louvers 22c.

In FIG. 4, a portion surrounded by a one-dotted broken line indicates a portion corresponding to the upstream flat portion 22f of the fin 22. In the example shown in FIG. 4, the upstream flat portion 22f of the fin 22 extends from the most upstream portion in the flow direction of the supercharged intake air in the second downstream flow path 26f to a middle part of the second downstream flow path 26f in the widthwise length. Accordingly, both the upstream flat portion 22f and the louver 22c are provided in a part of the fin 22 corresponding to the second downstream flow path 26f of the flow path tube 21. In the example shown in FIG. 4, the upstream flat portion 22f extends entirely in the second downstream flow path 26f in the flow direction of the second cooling water. That is, the upstream flat portion 22f is provided in all the wall portions 22a constituting the fin 22.

Since the louver 22c is not formed in the upstream flat portion 22f, the heat transfer coefficient of the fin 22 is lower than that of the portion where the louver 22c is formed. On the upstream side in the supercharged intake air in which the upstream flat portion 22f is provided, the heat transfer coefficient is lower than that of the downstream side in which the louver 22c is provided, and accordingly the heat exchange between the supercharged intake air and the fin 22 is limited. That is, the upstream flat portion 22f constitutes a heat exchange limiting portion in which heat exchange between the supercharged intake air and the second cooling water flowing through the second cooling water flow path 26 is suppressed.

According to the above-described first embodiment, in the intercooler 20 which cools the supercharged intake air by using two kinds of the cooling water having different temperature, the upstream flat portion, in which the louver 22c is not formed in the fin 22, is provided in the most upstream portion in the flow direction of the supercharged intake air. According to this, in the most upstream portion in the flow direction of the supercharged intake air, the heat of the supercharged intake air is prevented from being transmitted to the second cooling water in the second outlet side flow path (second downstream flow path) 26f through the fin 22. As a result, it is possible to suppress boiling of the second cooling water in the second outlet side flow path 26f where the second cooling water easily boils. As a result, it is possible to suppress boiling of the second cooling water in the second outlet side flow path 26f where the second cooling water easily boils. Accordingly, temperature increase of components around the second outlet side flow path 26f can be suppressed, and reduction in strength and breakage can be avoided.

Further, according to the first embodiment, the upstream flat portion 22f can be provided and the above effect can be obtained by a simple means such as not forming the louver 22c in a part of the fin 22. Since the fins 22 can be manufactured by roller molding similarly to the conventional one, it is possible to manufacture the intercooler 20 without reducing the productivity.

Second Embodiment

Next, a second embodiment of the present disclosure will be described. In the second embodiment, only parts different from the above-described first embodiment will be described.

Figure 7:
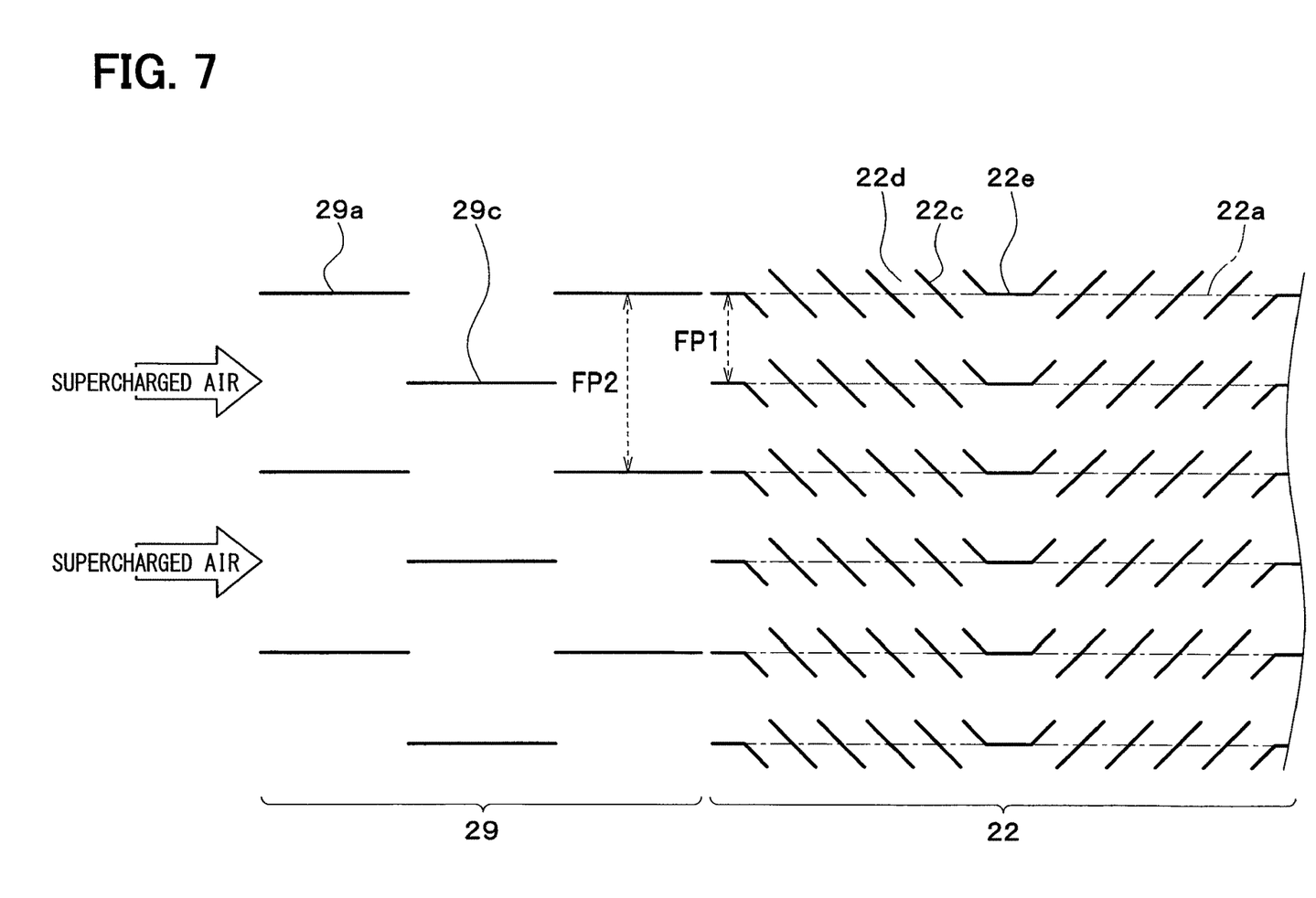
FIG. 7 is a cross-sectional view of offset fins and louver fins according to a second embodiment of the present disclosure.

FIG. 7 is a cross-sectional view of the fins 22, 29 of the second embodiment and corresponds to FIG. 6 of the first embodiment. As shown in FIG. 7, in the second embodiment, two types of fins 22, 29 are provided between adjacent flow path tubes 21.

Louver fins 22 are provided on the downstream side in the flow direction of the supercharged intake air. The louver fins 22 of the second embodiment have the same configuration as the louver fins described in the first embodiment except that the upstream flat portion 22f is not provided. Offset fins 29 are provided on the upstream side in the flow direction of the supercharged intake air.

Figure 8:
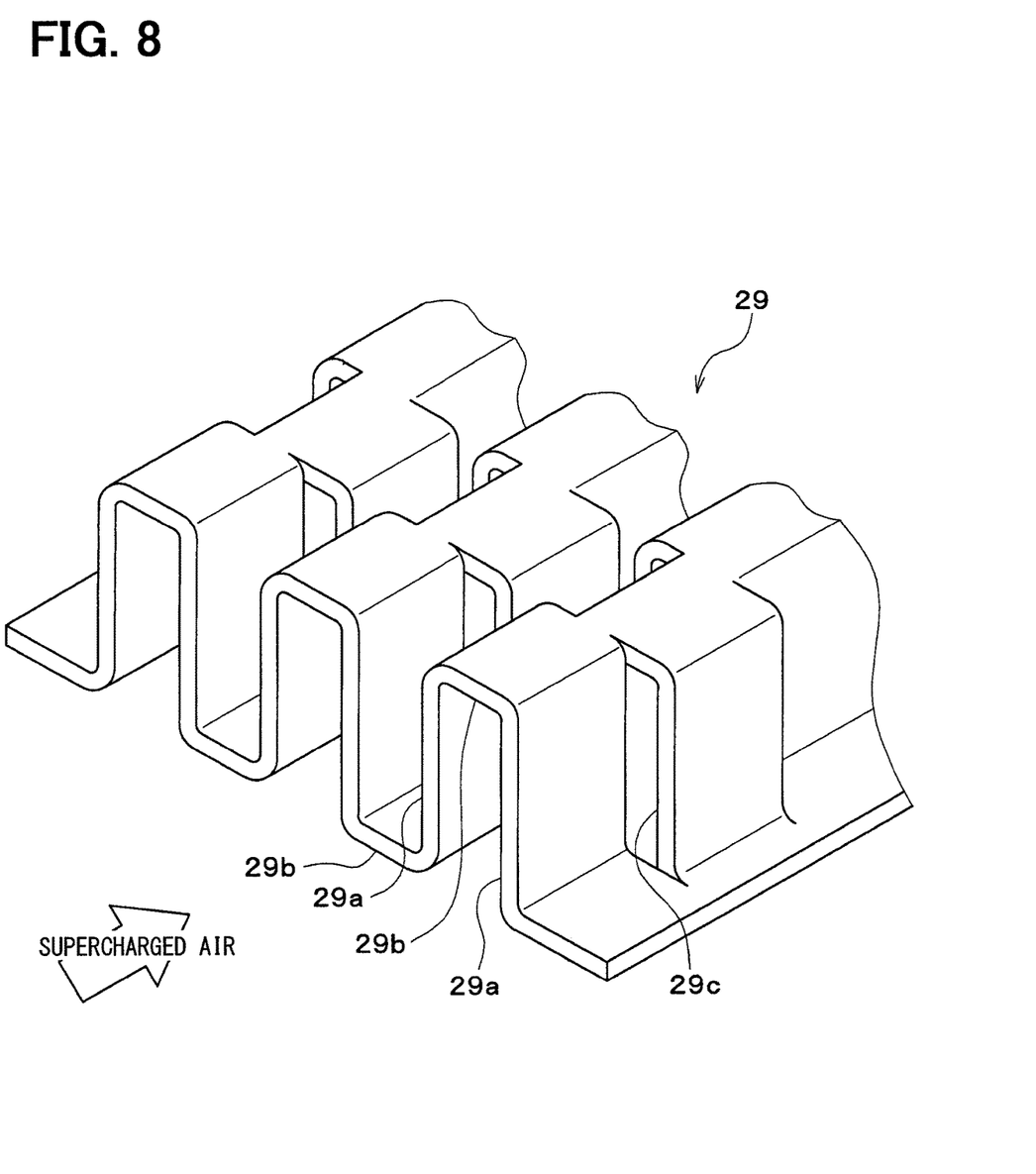
FIG. 8 is a perspective view of the offset fins according to the second embodiment.

As shown in FIG. 8, the offset fin 29 has a corrugated shape in which wall portions 29a constituting flat portions and peak portions 29b constituting bent portions are continuous. The offset fin 29 has a corrugated shape in which the peak portions 29b are alternately located on one side and the other side in a direction intersecting the direction of the flow of the supercharged intake air. The supercharged intake air flow path which is a space between the flow path tubes 21 stacked with each other is partitioned into multiple flow paths by the wall portion 29a. On the wall portion 29a, multiple cut-raised portions 29c partially cut and raised are provided. The wall portion 29a and the cut-raised portion 29c are alternately arranged in a zigzag manner along the flow direction of supercharged intake air.

The louver fins 22 and the offset fins 29 are formed separately. The louver fins 22 and the offset fins 29 are separated from each other.

The fin pitch FP2 which is the interval between the adjacent wall portions 29a of the offset fin 29 is longer than the fin pitch FP1 which is the interval between the adjacent wall portions 22a of the louver fin 22. In the example shown in FIG. 7, the fin pitch FP2 of the offset fin 29 is twice as long as the fin pitch FP1 of the louver fin 22.

The heat transfer coefficient of the offset fins 29 configured as offset fins is lower than that of the louver fins 22 configured as louver fins. Accordingly, on the upstream side in the supercharged intake air in which the offset fin 29 is provided, the heat transfer coefficient is lower than that of the downstream side in which the louver fin 22 is provided, and accordingly the heat exchange between the supercharged intake air and the fin 29 is limited. That is, the offset fin 29 of the second embodiment constitutes a heat exchange limiting portion in which heat exchange between the supercharged intake air and the second cooling water flowing through the second cooling water flow path 26 is suppressed.

According to the above-described second embodiment, in the intercooler 20 which cools the supercharged intake air by using two kinds of the cooling water having different temperature, the offset fin 29, whose heat transfer coefficient is lower than the louver fin 22, is provided in the most upstream portion in the flow direction of the supercharged intake air. According to this, in the most upstream portion in the flow direction of the supercharged intake air, the heat of the supercharged intake air is limited from being transmitted to the second cooling water in the second outlet side flow path 26f through the offset fin 29. As a result, it is possible to suppress boiling of the second cooling water in the second outlet side flow path 26f where the second cooling water easily boils. Accordingly, temperature increase of components around the second outlet side flow path 26f can be suppressed, and reduction in strength and breakage can be avoided.

In the second embodiment, the fin pitch FP2 of the offset fin 29 is longer than the fin pitch FP1 of the louver fins 22. According to this also, the heat transfer coefficient of the offset fin 29 is lower than that of the louver fins 22. Accordingly, in the most upstream portion in the flow direction of the supercharged intake air, the heat of the supercharged intake air can be effectively limited from being transmitted to the second cooling water in the second outlet side flow path 26f through the offset fin 29, and the second cooling water can be prevented from boiling in the second outlet side flow path 26f.

Third Embodiment

Next, a third embodiment of the present disclosure will be described. In the third embodiment, only parts different from the above-described embodiments will be described. The third embodiment differs from the second embodiment in that a straight fin 30 is provided on the upstream side of the louver fins 22 in the flow direction of the supercharged intake air.

Figure 9:
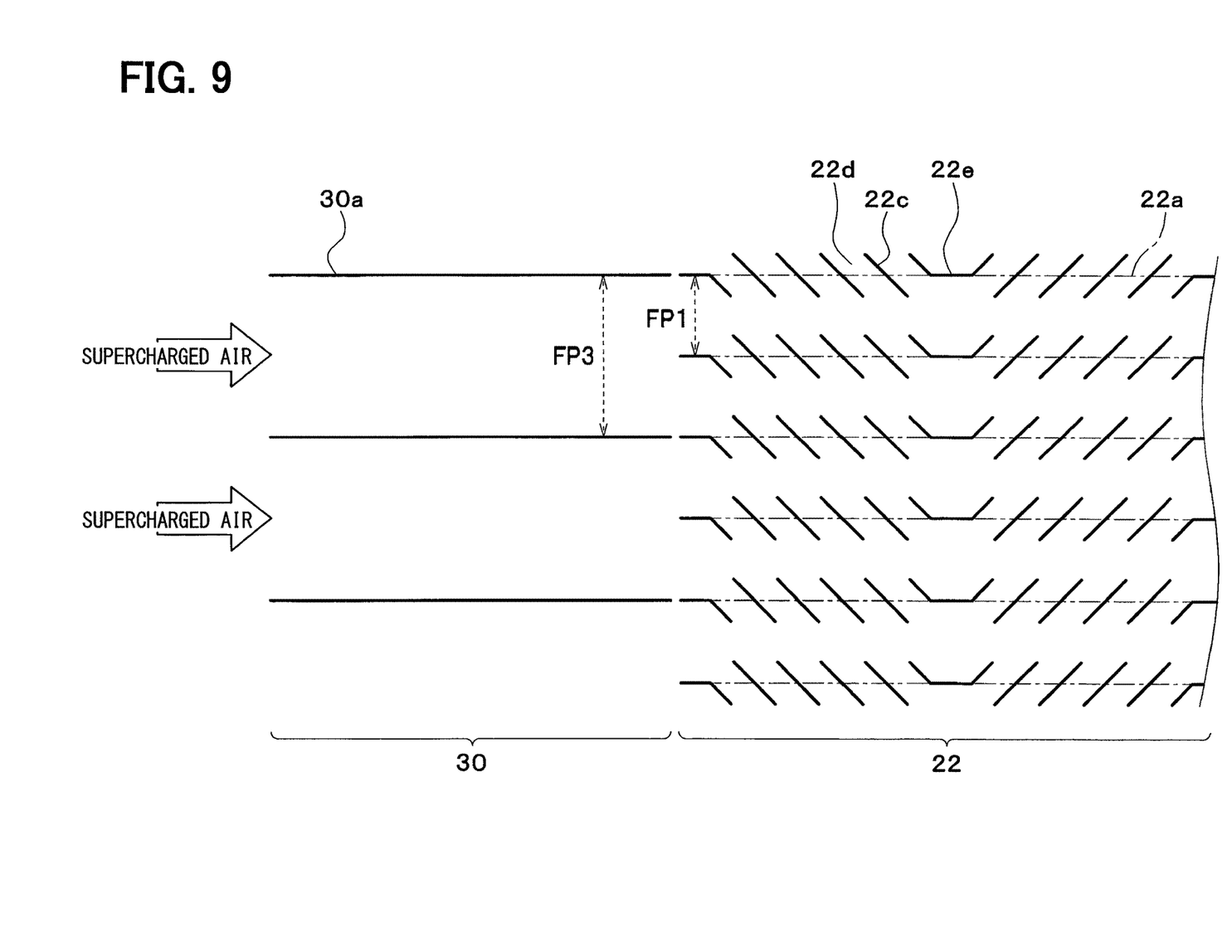
FIG. 9 is a cross-sectional view of straight fins and louver fins according to a third embodiment of the present disclosure.

FIG. 9 is a cross-sectional view of the fins 22, 29 of the third embodiment and corresponds to FIG. 6 of the first embodiment. FIG. 9 corresponds to FIG. 7 of the second embodiment. As shown in FIG. 9, in the third embodiment, two types of fins 22, 30 are provided between adjacent flow path tubes 21. In the third embodiment, straight fins 30 are provided on the upstream side in the flow direction of the supercharged intake air.

Figure 10:
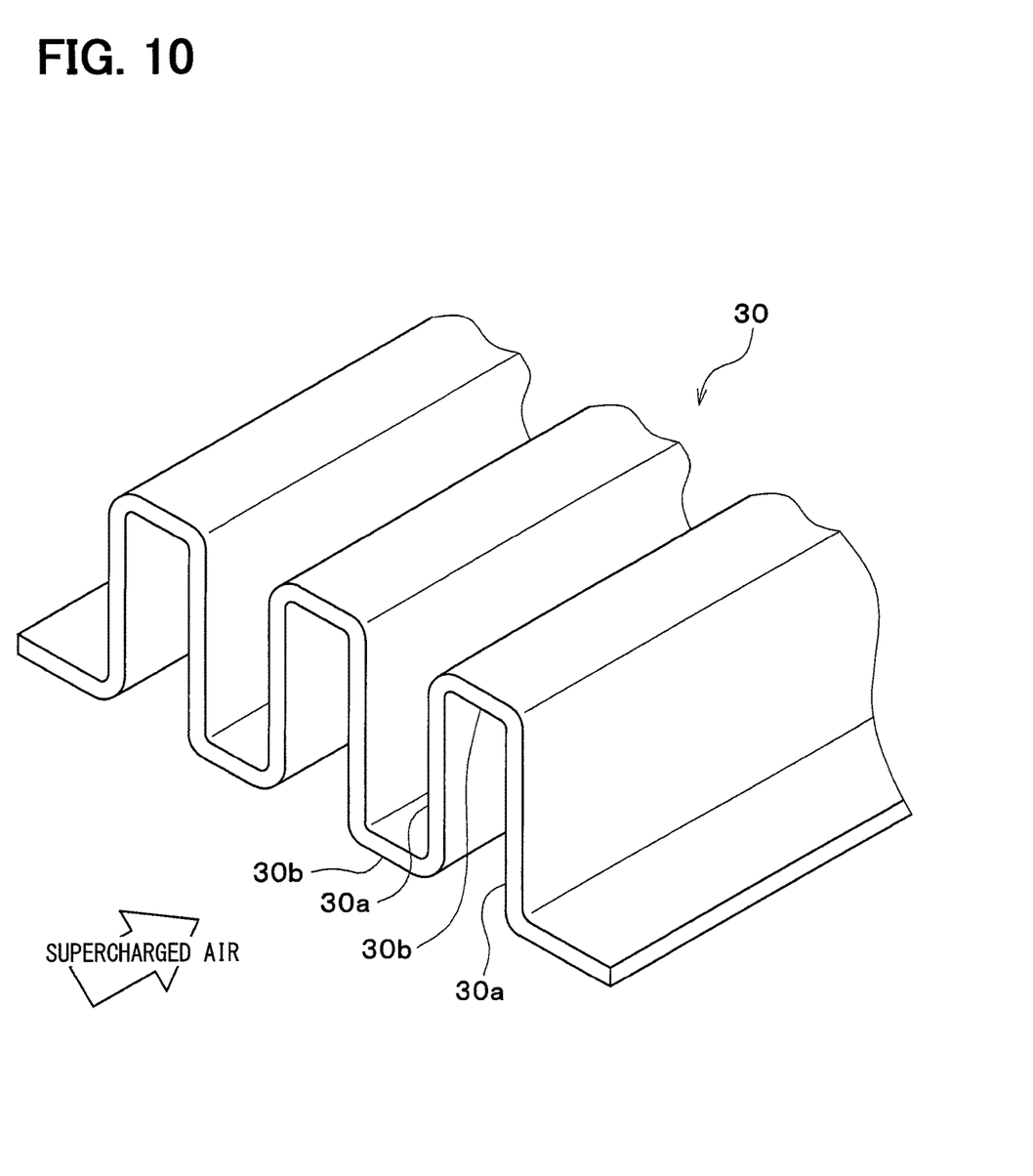
FIG. 10 is a perspective view of the straight fins according to the third embodiment.

The straight fin 30 has a corrugated shape in which wall portions 30a constituting flat portions and peak portions 30b constituting bent portions are continuous. The straight fin 30 has a corrugated shape in which the peak portions 29b are alternately located on one side and the other side in a direction intersecting the direction of the flow of the supercharged intake air. The supercharged intake air flow path which is a space between the flow path tubes 21 stacked with each other is partitioned into multiple flow paths by the wall portion 30a. The wall portion 30a of the straight fin 30 linearly extends along the flow direction of supercharged intake air.

The louver fins 22 and the straight fins 30 are formed separately. The louver fins 22 and the straight fins 30 are separated from each other.

The fin pitch FP3 which is the interval between the adjacent wall portions 30a of the straight fin 30 is longer than the fin pitch FP1 which is the interval between the adjacent wall portions 22a of the louver fin 22. In the example shown in FIG. 9, the fin pitch FP3 of the straight fin 30 is twice as long as the fin pitch FP1 of the louver fin 22.

The heat transfer coefficient of the straight fins 30 configured as straight fins is lower than that of the louver fins 22 configured as louver fins. Accordingly, on the upstream side in the supercharged intake air in which the straight fin 30 is provided, the heat transfer coefficient is lower than that of the downstream side in which the louver fin 22 is provided, and accordingly the heat exchange between the supercharged intake air and the fin 30 is limited. That is, the straight fin 30 of the third embodiment constitutes a heat exchange limiting portion in which heat exchange between the supercharged intake air and the second cooling water flowing through the second cooling water flow path 26 is suppressed.

According to the above-described third embodiment, in the intercooler 20 which cools the supercharged intake air by using two kinds of the cooling water having different temperature, the straight fin 30, whose heat transfer coefficient is lower than the louver fin 22, is provided in the most upstream portion in the flow direction of the supercharged intake air. According to this, in the most upstream portion in the flow direction of the supercharged intake air, the heat of the supercharged intake air is limited from being transmitted to the second cooling water in the second outlet side flow path 26f through the straight fin 30. As a result, it is possible to suppress boiling of the second cooling water in the second outlet side flow path 26f where the second cooling water easily boils. Accordingly, temperature increase of components around the second outlet side flow path 26f can be suppressed, and reduction in strength and breakage can be avoided.

In the third embodiment, the fin pitch FP3 of the straight fin 30 is longer than the fin pitch FP1 of the louver fins 22. According to this also, the heat transfer coefficient of the straight fin 30 is lower than that of the louver fins 22. Accordingly, in the most upstream portion in the flow direction of the supercharged intake air, the heat of the supercharged intake air can be effectively limited from being transmitted to the second cooling water in the second outlet side flow path 26f through the straight fin 30, and the second cooling water can be prevented from boiling in the second outlet side flow path 26f.

The present disclosure is not limited to the above embodiments and can be modified in various manners as described below without departing from the gist of the present disclosure.

In the above-described first embodiment, the upstream flat portion 22f of the fin 22 extends from the most upstream portion in the flow direction of the supercharged intake air in the second downstream flow path 26f to middle of the widthwise length of the second downstream flow path 26f. However, the length of the upstream flat portion 22f is not limited to this. It is acceptable as long as the upstream flat portion 22f of the fin 22 is provided at least in a portion corresponding to the most upstream portion of the second downstream flow path 26f in the flow direction of the supercharged intake air. That is, the length of the upstream flat portion 22f in the flow direction of the supercharged intake air may be shortened or elongated relative to the configuration shown in FIG. 4. In the case where the length of the upstream flat portion 22f in the flow direction of the supercharged intake air is increased, the upstream flat portion 22f may be extended so as to correspond to the entire second cooling water flow path 26. This is because the heat exchange between the fins 22 and the flow path tubes 21 is secured also in the upstream flat portion 22f where the louver 22c is not provided. That is, it is acceptable as long as the upstream flat portion 22f is provided at a position corresponding to the second cooling water flow path 26 and the louver 22c is provided at a position corresponding to the first cooling water flow path 25 in the fin 22.

In the above-described first embodiment, the upstream flat portion 22f of the fin 22 entirely extends in the second downstream flow path 26 in the flow direction of the second cooling water. However, the non-bonded portion 30 is not limited to this. It is acceptable as long as the upstream flat portion 22f of the fin 22 is provided at least in the most downstream portion of the second downstream flow path 26f (that is, a side near the second outlet portion 26b) in the flow direction of the second cooling water.

That is, it is acceptable as long as the offset fin 29 of the second embodiment and the straight fin 30 of the third embodiment are provided at least in a portion corresponding to the most upstream portion of the second downstream flow path 26f in the flow direction of the supercharged intake air. It is acceptable as long as the offset fin 29 of the second embodiment and the straight fin 30 of the third embodiment are provided at least in a portion corresponding to the most downstream portion of the second downstream flow path 26f in the flow direction of the second cooling water (i.e. a side close to the second outlet portion 26b).

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An intercooler that cools supercharged intake air by exchanging heat between cooling medium and the supercharged intake air supercharged to an engine by a supercharger, the intercooler comprising:
   a heat exchange portion in which flow path tubes and fins are stacked with each other, the heat exchange portion being configured to exchange heat between the cooling medium flowing inside the flow path tubes and the supercharged intake air flowing outside the flow path tubes, wherein
   the cooling medium includes first cooling medium and second cooling medium, a temperature of the second cooling medium being higher than a temperature of the first cooling medium,
   the flow path tubes define therein
      a first cooling medium flow path through which the first cooling medium flows in a direction intersecting a flow direction of the supercharged intake air, and
      a second cooling medium flow path through which the second cooling medium flows in a direction intersecting the flow direction of the supercharged intake air,
   the second cooling medium flow path is located upstream of the first cooling medium flow path with respect to the flow direction of the supercharged intake air,
   the first cooling medium flow path includes a first U-turn portion in which the first cooling medium makes a U-turn,
   the second cooling medium flow path includes
      a second U-turn portion in which the second cooling medium makes a U-turn,
      a downstream flow path located downstream of the second U-turn portion, and
      an upstream flow path located upstream of the second U-turn portion,
   the downstream flow path is located upstream of the upstream flow path with respect to the flow direction of the supercharged intake air,
   the fins include a heat exchange limiting portion at least in a part adjacent to a most upstream part, in the flow direction of the supercharged intake air, of the downstream flow path, the heat exchange limiting portion being configured to limit a heat exchange between the supercharged intake air and the second cooling medium,
   the heat exchange limiting portion is provided at least at a position adjacent to a most downstream part, in the flow direction of the second heat medium, of the downstream flow path, and
   a length of the heat exchange limiting portion in the flow direction of the supercharged intake air is equal to or longer than half of a length of the downstream flow path in the flow direction of the supercharged intake air.

2. The intercooler according to claim 1, wherein
   the fins are louver fins in which a plurality of louvers are provided in wall portions having corrugated shapes in cross-section, and
   the heat exchange limiting portion is a non-louvered portion in which no louver is provided.

3. The intercooler according to claim 1, wherein
   a length of the heat exchange limiting portion in the flow direction of the supercharged intake air is longer than a length of a louver pitch.

4. The intercooler according to claim 1, wherein
   a length of the heat exchange limiting portion in the flow direction of the supercharged intake air is at least twice a length of a louver pitch.

5. An intercooler that cools supercharged intake air by exchanging heat between cooling medium and the supercharged intake air supercharged to an engine by a supercharger, the intercooler comprising:
   a heat exchange portion in which flow path tubes and fins are stacked with each other, the heat exchange portion being configured to exchange heat between the cooling medium flowing inside the flow path tubes and the supercharged intake air flowing outside the flow path tubes, wherein the cooling medium includes first cooling medium and second cooling medium, a temperature of the second cooling medium being higher than a temperature of the first cooling medium, the flow path tubes define therein
  a first cooling medium flow path through which the first cooling medium flows in a direction intersecting a flow direction of the supercharged intake air, and
  a second cooling medium flow path through which the second cooling medium flows in a direction intersecting the flow direction of the supercharged intake air, the second cooling medium flow path is located upstream of the first cooling medium flow path with respect to the flow direction of the supercharged intake air, the first cooling medium flow path includes a first U-turn portion in which the first cooling medium makes a U-turn, the second cooling medium flow path includes
  a second U-turn portion in which the second cooling medium makes a U-turn
  a downstream flow path located downstream of the second U-turn portion, and
  an upstream flow path located upstream of the second U-turn portion, the downstream flow path is located upstream of the upstream flow path with respect to the flow direction of the supercharged intake air, the fins include a heat exchange limiting portion at least in a part adjacent to a most upstream part, in the flow direction of the supercharged intake air, of the downstream flow path, the heat exchange limiting portion being configured to limit a heat exchange between the supercharged intake air and the second cooling medium, the heat exchange limiting portion is provided at least at a position adjacent to a most downstream part, in the flow direction of the second heat medium, of the downstream flow path, the fins include
  a louver fin in which a plurality of louvers are provided in a wall portion having a corrugated shape in cross-section, and
  an offset fin in which a cut-raised portion is provided in a wall portion having a corrugated shape in cross-section, the cut-raised portion being partially cut and raised from the wall portion, the offset fin and the louver fin are separated from each other, and the heat exchange limiting portion is the offset fin.

6. An intercooler that cools supercharged intake air by exchanging heat between cooling medium and the supercharged intake air supercharged to an engine by a supercharger, the intercooler comprising:

a heat exchange portion in which flow path tubes and fins are stacked with each other, the heat exchange portion being configured to exchange heat between the cooling medium flowing inside the flow path tubes and the supercharged intake air flowing outside the flow path tubes, wherein the cooling medium includes first cooling medium and second cooling medium, a temperature of the second cooling medium being higher than a temperature of the first cooling medium, the flow path tubes define therein
  a first cooling medium flow path through which the first cooling medium flows in a direction intersecting a flow direction of the supercharged intake air, and
  a second cooling medium flow path through which the second cooling medium flows in a direction intersecting the flow direction of the supercharged intake air, the second cooling medium flow path is located upstream of the first cooling medium flow path with respect to the flow direction of the supercharged intake air, the first cooling medium flow path includes a first U-turn portion in which the first cooling medium makes a U-turn, the second cooling medium flow path includes
  a second U-turn portion in which the second cooling medium makes a U-turn
  a downstream flow path located downstream of the second U-turn portion, and
  an upstream flow path located upstream of the second U-turn portion, the downstream flow path is located upstream of the upstream flow path with respect to the flow direction of the supercharged intake air, the fins include a heat exchange limiting portion at least in a part adjacent to a most upstream part, in the flow direction of the supercharged intake air, of the downstream flow path, the heat exchange limiting portion being configured to limit a heat exchange between the supercharged intake air and the second cooling medium, the heat exchange limiting portion is provided at least at a position adjacent to a most downstream part, in the flow direction of the second heat medium, of the downstream flow path, the fins include
  a louver fin in which a plurality of louvers are provided in a wall portion having a corrugated shape in cross-section, and
  a straight fin in which a wall portion whose cross-section has a corrugated shape extends straight, the straight fin and the louver fin are separated from each other, and the heat exchange limiting portion is the straight fin.

* * * * *